(12) United States Patent
Fan et al.

(10) Patent No.: US 9,990,229 B2
(45) Date of Patent: Jun. 5, 2018

(54) SCHEDULING METHOD AND APPARATUS FOR APPLYING LAXITY CORRECTION BASED ON TASK COMPLETION PROPORTION AND PRESET TIME

(71) Applicant: Huawei Technologies Co., Ltd., Shenzhen (CN)

(72) Inventors: Dongrui Fan, Beijing (CN); Xiaochun Ye, Beijing (CN); Da Wang, Beijing (CN); Hao Zhang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days. days.

(21) Appl. No.: 14/730,425

(22) Filed: Jun. 4, 2015

(65) Prior Publication Data

US 2015/0268996 A1    Sep. 24, 2015

Related U.S. Application Data

(63) Continuation of application No. PCT/CN2013/087405, filed on Nov. 19, 2013.

(30) Foreign Application Priority Data

Dec. 18, 2012 (CN) .......................... 2012 1 0551909

(51) Int. Cl.
*G06F 9/48* (2006.01)
*G06F 3/12* (2006.01)
*G06F 9/50* (2006.01)

(52) U.S. Cl.
CPC ............ *G06F 9/4887* (2013.01); *G06F 3/126* (2013.01); *G06F 9/4881* (2013.01); *G06F 9/5038* (2013.01)

(58) Field of Classification Search
None
See application file for complete search history.

(56) References Cited

U.S. PATENT DOCUMENTS 5,636,124 A    6/1997 Rischar et al.
5,901,296 A *  5/1999 Lackman .............. G06F 13/368
                                                        710/113

(Continued)

FOREIGN PATENT DOCUMENTS

CN         1615471 A     5/2005
CN      101093456 A    12/2007

(Continued)

OTHER PUBLICATIONS

Carpenter et al, A Categorization of Real-time Multiprocessor Scheduling Problems and Algorithms, 2004, CRC Press, Handbook of Scheduling Algorithms, Models, and Performance Analysis, pp. 1-30.*

(Continued)

*Primary Examiner* — Abu Zar Ghaffari
(74) *Attorney, Agent, or Firm* — Conley Rose, P.C.

(57) ABSTRACT

A real-time multi-task scheduling method and apparatus for dynamically scheduling a plurality of tasks in the computing system are disclosed. In the method, a processor of the computing system determines that laxity correction should be performed for a currently scheduled task, and then acquires a remaining execution time of the currently scheduled task according to an execution progress of the currently scheduled task and a time for which the currently scheduled task has been executed. After acquiring a laxity of the currently scheduled task according to the remaining execution time of the currently scheduled task and a deadline of the currently scheduled task, the processor determines a priority of the currently scheduled task according to the laxity of the currently scheduled task, and re-determines a (Continued)

priority queue according to the priority of the task. Then, the processor scheduling the plurality of tasks according to the re-determined priority queue.

20 Claims, 4 Drawing Sheets

(56) References Cited

U.S. PATENT DOCUMENTS

| | | | | |
|---|---|---|---|---|
| 6,021,425 | A * | 2/2000 | Waldron, III | G06F 9/4881 718/103 |
| 6,154,735 | A * | 11/2000 | Crone | B61L 27/0016 706/16 |
| 6,411,982 | B2 * | 6/2002 | Williams | 718/102 |
| 6,434,443 | B1 * | 8/2002 | Lin | G05B 19/41865 700/100 |
| 6,553,415 | B1 * | 4/2003 | Manwiller | G06F 9/4411 709/222 |
| 7,093,256 | B2 * | 8/2006 | Bloks | G06F 9/4887 370/395.4 |
| 7,734,833 | B2 * | 6/2010 | McKenney | G06F 9/4887 710/15 |
| 7,793,294 | B2 * | 9/2010 | Haeri | G06F 9/4887 718/102 |
| 7,904,192 | B2 * | 3/2011 | Chua | G06Q 10/06 700/100 |
| 8,321,558 | B1 * | 11/2012 | Sirota | G06F 9/5011 709/201 |
| 8,555,281 | B1 * | 10/2013 | van Dijk | G06F 9/4881 718/100 |
| 8,954,975 | B2 * | 2/2015 | Kim | G06F 9/4887 718/103 |
| 2002/0120661 | A1 * | 8/2002 | Binns | G06F 9/4887 718/102 |
| 2002/0156669 | A1 | 10/2002 | Verhaegh et al. | |
| 2005/0144332 | A1 * | 6/2005 | Nellitheertha | G06F 9/4881 710/15 |
| 2007/0011683 | A1 * | 1/2007 | Helander | G06F 9/4887 718/104 |
| 2007/0143761 | A1 * | 6/2007 | Deng | G06F 9/4881 718/103 |
| 2007/0168861 | A1 * | 7/2007 | Bell | G06F 3/0481 715/701 |
| 2007/0220517 | A1 * | 9/2007 | Lippett | G06F 1/3203 718/102 |
| 2007/0300231 | A1 | 12/2007 | Aguilar et al. | |
| 2010/0257532 | A1 | 10/2010 | Liang et al. | |
| 2011/0067032 | A1 * | 3/2011 | Daly | G06F 9/4881 718/103 |
| 2011/0271127 | A1 * | 11/2011 | Thabet | G06F 1/3203 713/320 |
| 2011/0302589 | A1 * | 12/2011 | Aussagues | G06F 9/3851 718/104 |
| 2012/0167101 | A1 * | 6/2012 | Kandula | H04L 67/325 718/102 |
| 2013/0055276 | A1 * | 2/2013 | Park | G06F 9/4887 718/103 |
| 2013/0111497 | A1 * | 5/2013 | Chen | G06F 11/0709 718/107 |
| 2013/0212277 | A1 * | 8/2013 | Bodik | G06F 9/4887 709/226 |
| 2014/0059553 | A1 * | 2/2014 | Chandhoke | G06F 9/4843 718/102 |
| 2015/0293787 | A1 * | 10/2015 | Bilavarn | G06F 9/4881 718/102 |

FOREIGN PATENT DOCUMENTS

| | | | | |
|---|---|---|---|---|
| CN | 101127061 A | | 2/2008 | |
| CN | 101158849 A | | 4/2008 | |
| EP | 2256632 A1 * | | 12/2010 | G06F 9/4887 |
| WO | WO 2009087317 A2 * | | 7/2009 | G06F 9/4887 |

OTHER PUBLICATIONS

Cho et al, An Optimal Real-Time Scheduling Algorithm for Multiprocessors, 2006, IEEE, 27th IEEE International Real-Time System Symposiym (RTSS'06), pp. 101-110.*
Davis et al, A Survey of Hard Real-Time Scheduling for Multiprocessor Systems, 2011, ACM, ACM Computing Surveys (CSUR) vol. 43 Issue 4 pp. 35:1-44.*
Oh et al, A Modified Least-Laxity-First Scheduling Algorithm for Real-Time Tasks, 1998, IEEE, Fifth International Conference Proceedings on Real-Time Computing Systems and Applications, pp. 1-6.*
Yazdi et al, Exploiting Laxity for Heterogeneous Multiprocessor Real-time Scheduling, 2008, IEEE, 3rd International Conference on Information and Communication Technologies: From Theory to Applications, pp. 1-6.*
Kaladevi et al, A Comparative Study of Scheduling Algorithms for Real Time Task, 2010, International Journal of Advances in Science and Technology, vol. 1, No. 4, pp. 14-64.*
Jones, M., et al., "An Overview of the Rialto Real-Time Architecture," Technical Report, MSR-TR-96-13, Seventh ACM SIGOPS European Workshop, Sep. 9, 1996, 9 pages.
Foreign Communication From a Counterpart Application, European Application No. 13864362.2, Extended European Search Report dated Dec. 16, 2015, 8 pages.
Foreign Communication From a Counterpart Application, PCT Application No. PCT/CN2013/087405, English Translation of International Search Report dated Feb. 27, 2015, 2 pages.
Foreign Communication From a Counterpart Application, PCT Application No. PCT/CN2013/087405, English Translation of Written Opinion dated Feb. 27, 2015, 6 pages.
Partial English Translation and Abstract of Chinese Patent Application No. CN101127061, Aug. 16, 2016, 5 pages.
Lina, Z., "Research on Policy and Algorithm of Task Scheduling in Real-Time System," A Dissertation for the Degree of M. Eng, Dec. 2007, 25 pages.
Wang, X., "Research and Improvement of Linux and RTAI based Real-time Operating System," College of Computer Science of Chongqing, Apr. 2009, 75 pages.
English Translation of Wang, X., "Research and Improvement of Linux and RTAI based Real-time Operating System," College of Computer Science of Chongqing, May 2009, 21 pages.
Foreign Communication From a Counterpart Application, Chinese Application No. 201210551909.7, English Translation of Chinese Office Action dated Jul. 1, 2016, 12 pages.

* cited by examiner

SCHEDULING METHOD AND APPARATUS FOR APPLYING LAXITY CORRECTION BASED ON TASK COMPLETION PROPORTION AND PRESET TIME

CROSS-REFERENCE TO RELATED APPLICATIONS

This application is a continuation of International Application No. PCT/CN2013/087405, filed on Nov. 19, 2013, which claims priority to Chinese Patent Application No. 201210551909.7, filed on Dec. 18, 2012, both of which are hereby incorporated by reference in their entireties.

TECHNICAL FIELD

The present invention relates to the field of computers, and in particular, to a real-time multi-task scheduling method and apparatus.

BACKGROUND

In a universal hardware system and a matching operating system thereof, task scheduling is usually performed according to a time division principle. A scheduling algorithm emphasizes task fairness, and tries to let different tasks fairly occupy computing resources of a central processing unit (CPU) in turn. However, in reality, there is a specific real-time requirement on many applications, that is, it is required to fulfill a task within a specified time period, and respond to and process an external event that occurs randomly. For such applications, it is difficult for a common software and hardware scheduling algorithm that emphasizes task fairness to meet the requirement, and a task scheduling algorithm ensuring real-time quality must be used.

The prior art has the following technical solutions to solve the real-time quality problem.

A least laxity first (LLF) algorithm is used, where the laxity refers to a remaining idle time after a task is completed. Assuming that at a moment t, an execution time of a remaining part of a task is X and a deadline (absolute) of the task is D, an idle time (laxity) of the task is $L=D-t-X$. In the LLF algorithm, a priority of a task depends on the laxity. A smaller laxity indicates a higher priority. If tasks have a same laxity, a task whose deadline is earlier has a higher priority and is executed first. In addition, a task can be scheduled only when the laxity is greater than or equal to 0; otherwise, the task is terminated.

However, in the LLF algorithm, when a laxity value is calculated, D and t can be accurately obtained, but it is difficult to accurately estimate a remaining execution time of a task. In addition, because different hardware platforms have different configurations, running periods of time of a same program on different hardware platforms are also different. Therefore, when a task is created, it is difficult to accurately estimate a running time actually required by the task. When the running time actually required by the task is inaccurate, the calculation of a remaining execution time X of the task is also inaccurate in the LLF algorithm, and finally the calculation of a priority is inaccurate, thereby affecting actual efficiency of a real-time task scheduling algorithm.

SUMMARY

Embodiments of the present invention provide a real-time multi-task scheduling method and apparatus, which can dynamically correct a laxity value of a thread, to obtain a more accurate task priority, and further improve accuracy of real-time multi-task scheduling.

To achieve the foregoing objectives, the embodiments of the present invention use the following technical solutions.

According to a first aspect, a real-time multi-task scheduling method performed by a processor in a computing system for dynamically scheduling a plurality of tasks in the computing system is provided, where the method includes: determining that laxity correction should be performed for a currently scheduled task, where a laxity of the currently scheduled task refers to a remaining idle time after the currently scheduled task is completed; acquiring a remaining execution time of the currently scheduled task according to an execution progress of the currently scheduled task and a time for which the currently scheduled task has been executed, where the execution progress is a task completion proportion in the currently scheduled task; acquiring the laxity of the currently scheduled task according to the remaining execution time of the currently scheduled task and a deadline of the currently scheduled task; determining a priority of the currently scheduled task according to the laxity of the currently scheduled task, and re-determining a priority queue according to the determined priority of the currently scheduled task, where the priority queue is used to record a priority of the plurality of tasks, a priority of the currently scheduled task in the priority queue is determined by a laxity acquired according to a preset deadline of the currently scheduled task and a required execution time of the currently scheduled task, where the required execution time of the currently scheduled task is a previously acquired remaining execution time; and scheduling the plurality of tasks according to the re-determined priority queue.

According to the first aspect, in a first possible implementation manner, the determining that laxity correction should be performed for a currently scheduled task includes determining whether the execution progress of the currently scheduled task is equal to a preset task proportion; and if the execution progress of the currently scheduled task is equal to the preset task proportion, determining that laxity correction should be performed for the currently scheduled task.

According to the first aspect, in a second possible implementation manner, the determining that laxity correction should be performed for a currently scheduled task includes determining whether the time for which the currently scheduled task has been executed is equal to a preset time; and if the time for which the currently scheduled task has been executed is equal to the preset time, determining that laxity correction should be performed for the currently scheduled task.

According to a second aspect, a real-time multi-task scheduling apparatus for dynamically scheduling a plurality of tasks in the computing system is provided, where the apparatus includes a first determining unit, a second determining unit, a first acquiring unit, a second acquiring unit, and a scheduling unit, where the first determining unit is configured to determine that laxity correction should be performed for a currently scheduled task; the first acquiring unit is configured to acquire a remaining execution time of the currently scheduled task according to an execution progress of the currently scheduled task and a time for which the currently scheduled task has been executed, where the execution progress is a task completion proportion in the currently scheduled task; the second acquiring unit is configured to acquire a laxity of the currently scheduled task according to the remaining execution time of the currently scheduled task and a deadline of the currently scheduled task; the second determining unit is configured to determine a priority of the currently scheduled task according to the laxity of the currently scheduled task, and re-determine a priority queue according to the determined priority of the currently scheduled task, where the priority queue is used to record a priority of the plurality of tasks, a priority of the currently scheduled task in the priority queue is determined by a laxity acquired according to a preset deadline of the currently scheduled task and a required execution time of the currently scheduled task, where the required execution time of the currently scheduled task is a previously acquired remaining execution time; and the scheduling unit is configured to schedule the plurality of tasks according to the re-determined priority queue.

According to the second aspect, in a first possible implementation manner, that the first determining unit determines that laxity correction should be performed for a currently scheduled task includes determining whether the execution progress of the currently scheduled task is equal to a preset task proportion; and if the execution progress of the currently scheduled task is equal to the preset task proportion, determining that laxity correction should be performed for the currently scheduled task.

According to the second aspect, in a second possible implementation manner, that the first determining unit determines that laxity correction should be performed for a currently scheduled task includes determining whether the time for which the currently scheduled task has been executed is equal to a preset time; and if the time for which the currently scheduled task has been executed is equal to the preset time, determining that laxity correction should be performed for the currently scheduled task.

According to a third aspect, a real-time multi-task scheduling apparatus for dynamically scheduling a plurality of tasks in a computing system is provided, where the apparatus includes a processor, where the processor is configured to determine that laxity correction should be performed for a currently scheduled task, wherein a laxity of the currently scheduled task refers to a remaining idle time after the currently scheduled task is completed; the processor is further configured to acquire a remaining execution time of the currently scheduled task according to an execution progress of the currently scheduled task and a time for which the currently scheduled task has been executed, where the execution progress is a task completion proportion in the currently scheduled task; the processor is further configured to acquire a laxity of the currently scheduled task according to the remaining execution time of the currently scheduled task and a deadline of the currently scheduled task; the processor is further configured to determine a priority of the currently scheduled task according to the laxity of the currently scheduled task, and re-determine a priority queue according to the determined priority of the currently scheduled task, where the priority queue is used to record a priority of the plurality of tasks, a priority of the currently scheduled task in the priority queue is determined by a laxity acquired according to a preset deadline of the currently scheduled task and a required execution time of the currently scheduled task, where the required execution time of the currently scheduled task is a previously acquired remaining execution time; and the processor is further configured to schedule the plurality of tasks in the queue according to the re-determined priority queue.

According to the third aspect, in a first possible implementation manner, that the processor determines that laxity correction should be performed for a currently scheduled task includes determining whether the execution progress of the currently scheduled task is equal to a preset task proportion; and if the execution progress of the currently scheduled task is equal to the preset task proportion, determining that laxity correction should be performed for the currently scheduled task.

According to the third aspect, in a second possible implementation manner, that the processor determines that laxity correction should be performed for a currently scheduled task includes determining whether the time for which the currently scheduled task has been executed is equal to a preset time; and if the time for which the currently scheduled task has been executed is equal to the preset time, determining that laxity correction should be performed for the currently scheduled task.

The embodiments of the present invention provide a real-time multi-task scheduling method and apparatus. The method includes, after determining that laxity correction should be performed for a currently scheduled task, acquiring a remaining execution time of the currently scheduled task according to an execution progress of the currently scheduled task and a time for which the currently scheduled task has been executed; then, acquiring a laxity of the currently scheduled task according to the remaining execution time of the currently scheduled task and a deadline of the currently scheduled task; next, determining a priority of the task according to the laxity of the currently scheduled task, and re-determining a priority queue according to the priority of the task; and finally, successively scheduling tasks in the queue according to the re-determined priority queue.

Based on the descriptions of the foregoing technical solutions, because during task scheduling, a remaining execution time of a currently scheduled task can be dynamically corrected, a laxity value of the currently scheduled task can be further dynamically corrected, thereby obtaining a more accurate task priority, and improving accuracy of real-time multi-task scheduling.

BRIEF DESCRIPTION OF THE DRAWINGS

To describe the technical solutions in the embodiments of the present invention more clearly, the following briefly introduces the accompanying drawings required for describing the embodiments or the prior art. The accompanying drawings in the following description show merely drawings in some embodiments of the present invention.

DETAILED DESCRIPTION

The following clearly describes the technical solutions in the embodiments of the present invention with reference to the accompanying drawings in the embodiments of the present invention. The described embodiments are merely a part rather than all of the embodiments of the present invention.

Embodiment 1

Figure 1:
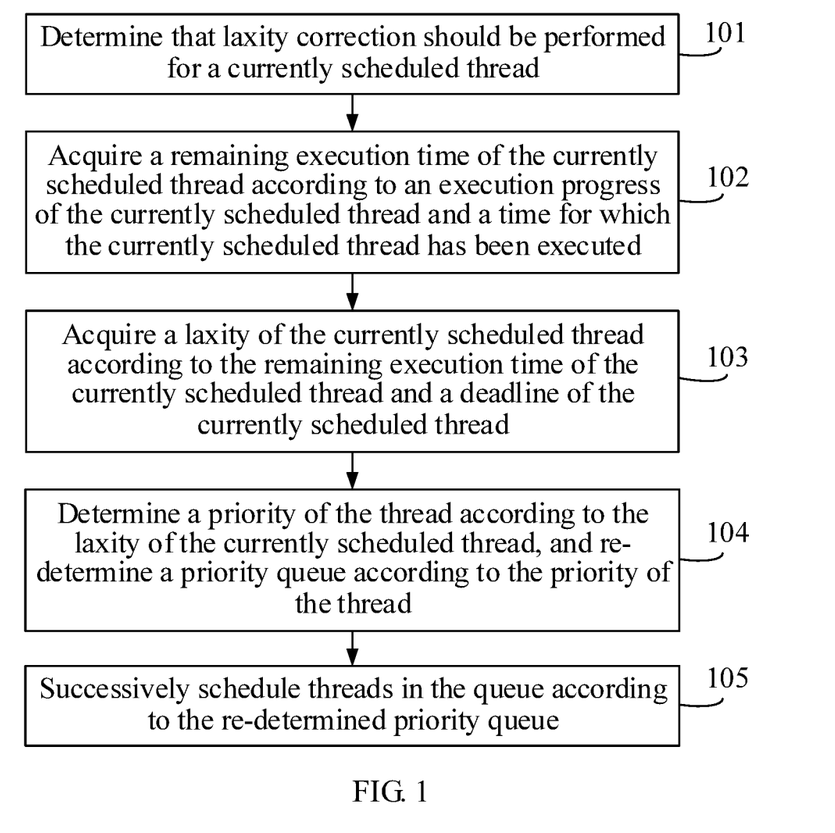
FIG. 1 shows a real-time multi-task scheduling method according to an embodiment of the present invention.

An embodiment of the present invention provides a real-time multi-task scheduling method, which is shown in FIG. 1, and the method includes the following.

101: Determine that laxity correction should be performed for a currently scheduled thread.

It may be determined according to a preset task proportion to perform laxity correction for the currently scheduled thread, and it may also be determined according to a preset time to perform laxity correction for the currently scheduled thread. This embodiment of the present invention does not limit how to determine that laxity correction should be performed for the currently scheduled thread.

102: Acquire a remaining execution time of the currently scheduled thread according to an execution progress of the currently scheduled thread and a time for which the currently scheduled thread has been executed.

The execution progress is a task completion proportion in the currently scheduled thread.

Herein, assuming that the time for which the currently scheduled thread has been executed is a, the execution progress of the currently scheduled thread is b %, and the remaining execution time of the currently scheduled thread is X, $$\frac{a}{b\%} = \frac{X}{1-b\%},$$

and the remaining execution time $$X = \frac{a(1-b\%)}{b\%}$$

is acquired.

103: Acquire a laxity of the currently scheduled thread according to the remaining execution time of the currently scheduled thread and a deadline of the currently scheduled thread.

Assuming that a current moment is t, the deadline of the currently scheduled thread is D, and the laxity of the currently scheduled thread is L, L=D−t−X.

Because the remaining execution time of the currently scheduled thread is dynamically acquired according to the execution progress of the currently scheduled thread and the time for which the currently scheduled thread has been executed, the laxity of the currently scheduled thread is also dynamically acquired.

104: Determine a priority of the thread according to the laxity of the currently scheduled thread, and re-determine a priority queue according to the priority of the thread.

The laxity of the currently scheduled thread is a corrected accurate value. An accurate thread priority can be obtained according to the laxity of the currently scheduled thread, and then a priority queue is re-determined according to the priority. If the currently scheduled thread has a high priority, the currently scheduled thread is put into a high-priority queue to queue up; otherwise, the currently scheduled thread is put into a common-priority queue to queue up.

105: Successively schedule threads in the queue according to the re-determined priority queue.

The foregoing real-time multi-task scheduling method may be implemented by using software, and may also be implemented in a manner supported by hardware, which is not limited in this embodiment of the present invention.

This embodiment of the present invention provides a real-time multi-task scheduling method. The method includes, after determining that laxity correction should be performed for a currently scheduled thread, acquiring a remaining execution time of the currently scheduled thread according to an execution progress of the currently scheduled thread and a time for which the currently scheduled thread has been executed; then, acquiring a laxity of the currently scheduled thread according to the remaining execution time of the currently scheduled thread and a deadline of the currently scheduled thread; next, determining a priority of the thread according to the laxity of the currently scheduled thread, and re-determining a priority queue according to the priority of the thread; and finally, successively scheduling threads in the queue according to the re-determined priority queue.

Based on the description of the foregoing embodiment, because during task scheduling, a remaining execution time of a currently scheduled thread can be dynamically corrected, a laxity value of the currently scheduled thread can be further dynamically corrected, thereby obtaining a more accurate task priority, and improving accuracy of real-time multi-task scheduling.

Embodiment 2

Figure 2:
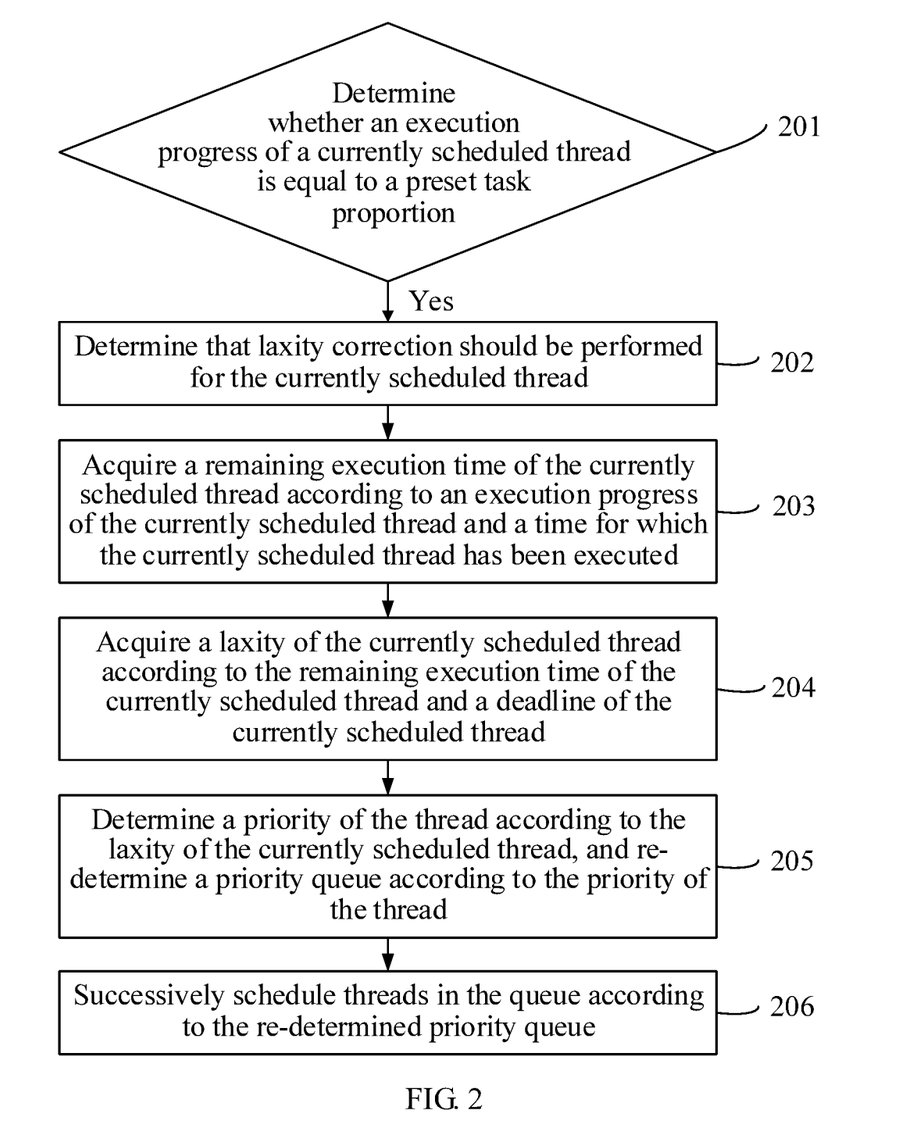
FIG. 2 shows another real-time multi-task scheduling method according to an embodiment of the present invention.

An embodiment of the present invention further provides a real-time multi-task scheduling method, which is shown in FIG. 2. The method includes the following.

201: Determine whether an execution progress of a currently scheduled thread is equal to a preset task proportion.

When the method is implemented by using software, the preset task proportion is a value set in a program, and the execution progress of the currently scheduled thread may be compared with the value.

When the method is implemented in a manner supported by hardware, the preset task proportion is controlled out of the hardware. For example, if the preset task proportion is 25%, a laxity correction operation may be performed when the task proportion is 25%. Certainly, when the method is implemented in a manner supported by hardware, a laxity correction operation may also be performed randomly. The embodiment of the present invention sets no limitation thereto.

If the execution progress of the currently scheduled thread is equal to the preset task proportion, step 202 is performed.

If the execution progress of the currently scheduled thread is not equal to the preset task proportion, execution of the currently scheduled thread is continued. The embodiment of the present invention sets no limitation thereto.

202: If the execution progress of the currently scheduled thread is equal to the preset task proportion, determine that laxity correction should be performed for the currently scheduled thread.

For example, in a thread, a program needs to perform an increment by 1 operation five times, and then, a programmer may perform a laxity correction operation between the second and the third increment by 1 operations, as shown in the following:

a=a+1;
a=a+1;

laxity correction laxity_correction (40%)
a=a+1;
a=a+1; and
a=a+1;

That is, the preset task proportion is 40% indicating that when the execution progress reaches 40%, it is determined that laxity correction should be performed for the currently scheduled thread.

203: Acquire a remaining execution time of the currently scheduled thread according to the execution progress of the currently scheduled thread and a time for which the currently scheduled thread has been executed.

The execution progress is a task completion proportion in the currently scheduled thread.

Herein, assuming that the time for which the currently scheduled thread has been executed is a, the execution progress of the currently scheduled thread is b %, and the remaining execution time of the currently scheduled thread is X, $$\frac{a}{b\%} = \frac{X}{1-b\%},$$

and the remaining execution time $$X = \frac{a(1-b\%)}{b\%}$$

is acquired.

It should be noted that, the time for which the currently scheduled thread has been executed is a sum of an execution time of the thread, but is not a time for which present scheduling has been executed.

204: Acquire a laxity of the currently scheduled thread according to the remaining execution time of the currently scheduled thread and a deadline of the currently scheduled thread.

Assuming that a current moment is t, the deadline of the currently scheduled thread is D, and the laxity of the currently scheduled thread is L, L=D−t−X.

Because the remaining execution time of the currently scheduled thread is dynamically acquired according to the execution progress of the currently scheduled thread and the time for which the currently scheduled thread has been executed, the laxity of the currently scheduled thread is also dynamically acquired.

205: Determine a priority of the thread according to the laxity of the currently scheduled thread, and re-determine a priority queue according to the priority of the thread.

The laxity of the currently scheduled thread is a corrected accurate value, an accurate thread priority may be obtained according to the laxity of the currently scheduled thread, and then a priority queue is re-determined according to the priority. If the currently scheduled thread has a high priority, the currently scheduled thread is put into a high-priority queue to queue up; otherwise, the currently scheduled thread is put into a common-priority queue to queue up.

206: Successively schedule threads in the queue according to the re-determined priority queue.

The foregoing real-time multi-task scheduling method may be implemented by using software, and may also be implemented in a manner supported by hardware, which is not limited in this embodiment of the present invention.

Optionally, for how to determine that laxity correction should be performed for a currently scheduled thread, it may also be determined, by comparing the time for which the currently scheduled thread has been executed with a preset time, to perform laxity correction for the currently scheduled thread, and the method includes determining whether the time for which the currently scheduled thread has been executed is equal to a preset time; and if the time for which the currently scheduled thread has been executed is equal to the preset time, determining that laxity correction should be performed for the currently scheduled thread.

Figure 3:
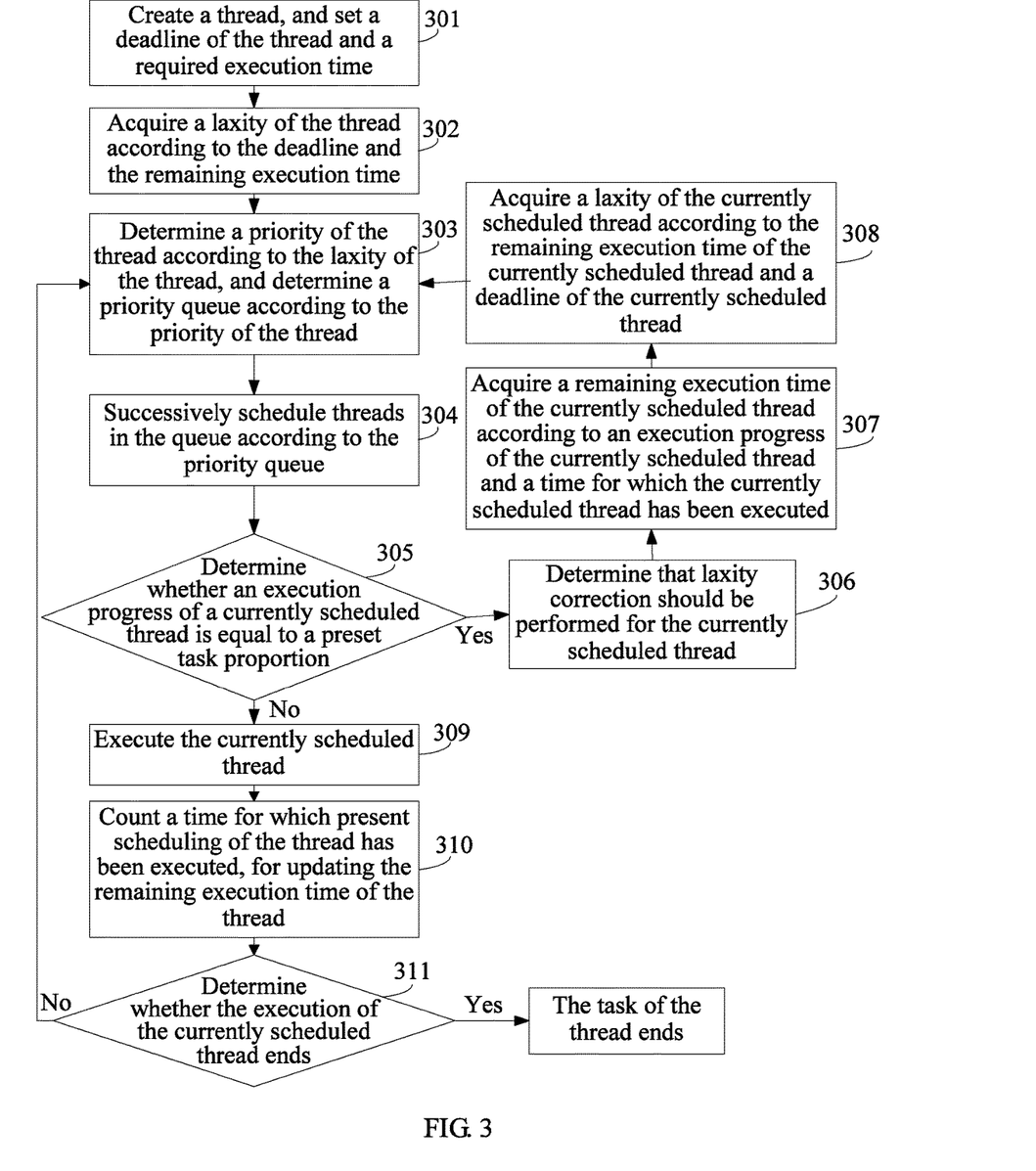
FIG. 3 is a schematic flowchart from creation of a thread to an end of execution according to an embodiment of the present invention.

Based on the real-time multi-task scheduling method in this embodiment, the following describes a whole process from creation of a thread to an end of execution, which is shown in FIG. 3. The method includes the following.

301: Create a thread, and set a deadline of the thread and a required execution time.

302: Acquire a laxity of the thread according to the deadline and a remaining execution time.

It should be noted that, the remaining execution time here is an initial thread remaining time, and is corresponding to the required execution time set in step 301.

303: Determine a priority of the thread according to the laxity of the thread, and determine a priority queue according to the priority of the thread.

304: Successively schedule threads in the queue according to the priority queue.

305: Determine whether an execution progress of a currently scheduled thread is equal to a preset task proportion.

If the execution progress of the currently scheduled thread is equal to the preset task proportion, step 306 is performed.

If the execution progress of the currently scheduled thread is not equal to the preset task proportion, step 309 is performed.

306: If the execution progress of the currently scheduled thread is equal to the preset task proportion, determine that laxity correction should be performed for the currently scheduled thread.

307: Acquire a remaining execution time of the currently scheduled thread according to the execution progress of the currently scheduled thread and a time for which the currently scheduled thread has been executed.

The execution progress is a task completion proportion in the currently scheduled thread.

308: Acquire a laxity of the currently scheduled thread according to the remaining execution time of the currently scheduled thread and a deadline of the currently scheduled thread.

After the laxity of the currently scheduled thread is acquired, priority queuing needs to be performed again according to the laxity, to wait to execute a task; therefore, step 303 is performed in this case.

309: Execute the currently scheduled thread.

310: Count a time for which present scheduling of the thread has been executed, for updating the remaining execution time of the thread.

During thread scheduling, a data pointer is needed to record information about a thread, where the information about the thread includes information such as an identifier (ID) of a process where the thread is in, an ID of the thread, a current latest laxity value of the thread, an execution deadline of the thread, a remaining execution time required for completing the thread, a pointer of a location of context information of the thread, and a next thread in a same priority queue. The information about the thread may be recorded in a table or in another manner, which is not limited in this embodiment of the present invention.

It should be noted that, at the time point when it is determined that laxity correction should be performed for a currently scheduled thread, a remaining execution time of the currently scheduled thread needs to be modified, and a laxity value is then corrected. In addition to this time point, the specific time point at which the laxity value and the remaining execution time of the thread are updated is not limited in this embodiment of the present invention. Theoretically, a user can update the remaining execution time at any time, and further update the laxity value. For example, at a time point when no laxity correction operation is performed in present scheduling but the currently scheduled thread needs to be suspended, a current remaining execution time of the thread may be updated according to a time for which the present scheduling has been executed and a remaining execution time after the present scheduling is started. During updating of the laxity value, compared with the laxity value at a time point when the present scheduling is started, at this time point, the laxity value of the thread does not change, but a laxity value of another thread in a priority queue changes as time goes on. Therefore, the laxity value needs to be updated according to the formula L=D−t−X in the foregoing embodiment.

311: Determine whether the execution of the currently scheduled thread ends.

If the execution of the currently scheduled thread ends, the operation required by the thread is completed.

If the execution of the currently scheduled thread does not end, step 303 is performed again, that is, priority queuing is performed again according to the laxity, to wait to execute a task, until the execution of the thread ends.

In the whole process from the creation of the thread to an end of execution, steps 305, 306, 307 and 308 are a part of the real-time multi-task scheduling method in FIG. 2, and the details are not described herein again. The rest steps belong to a part of the prior art and are also not described herein again.

The foregoing real-time multi-task scheduling method may be implemented by using software, and may also be implemented in a manner supported by hardware, which is not specifically limited in this embodiment of the present invention.

This embodiment of the present invention provides a real-time multi-task scheduling method. The method includes, after determining that laxity correction should be performed for a currently scheduled thread, acquiring a remaining execution time of the currently scheduled thread according to an execution progress of the currently scheduled thread and a time for which the currently scheduled thread has been executed; then, acquiring a laxity of the currently scheduled thread according to the remaining execution time of the currently scheduled thread and a deadline of the currently scheduled thread; next, determining a priority of the thread according to the laxity of the currently scheduled thread, and re-determining a priority queue according to the priority of the thread; and finally, successively scheduling threads in the queue according to the re-determined priority queue.

Based on the description of the foregoing embodiment, because during task scheduling, a remaining execution time of a currently scheduled thread can be dynamically corrected, a laxity value of the currently scheduled thread can be further dynamically corrected, thereby obtaining a more accurate task priority, and improving accuracy of real-time multi-task scheduling.

Embodiment 3

Figure 4:
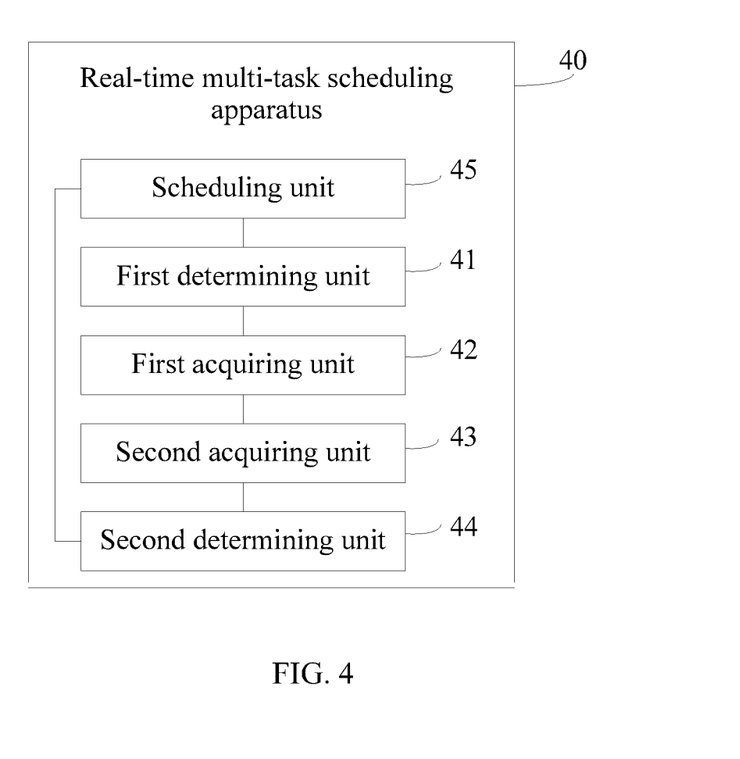
FIG. 4 shows a real-time multi-task scheduling apparatus according to an embodiment of the present invention.

An embodiment of the present invention provides a real-time multi-task scheduling apparatus 40, which is spe-cifically shown in FIG. 4, and the apparatus 40 includes a first determining unit 41, a first acquiring unit 42, a second acquiring unit 43, a second determining unit 44, and a scheduling unit 45.

The first determining unit 41 is configured to determine that laxity correction should be performed for a currently scheduled thread.

It may be determined according to a preset task proportion to perform laxity correction for the currently scheduled thread, and it may also be determined according to a preset time to perform laxity correction for the currently scheduled thread. This embodiment of the present invention does not specifically limit how to determine that laxity correction should be performed for the currently scheduled thread.

The first acquiring unit 42 is configured to acquire a remaining execution time of the currently scheduled thread according to an execution progress of the currently scheduled thread and a time for which the currently scheduled thread has been executed, where the execution progress is a task completion proportion in the currently scheduled thread.

Herein, assuming that the time for which the currently scheduled thread has been executed is a, the execution progress of the currently scheduled thread is b %, and the remaining execution time of the currently scheduled thread is X, $$\frac{a}{b\%} = \frac{X}{1-b\%},$$

and the remaining execution time $$X = \frac{a(1-b\%)}{b\%}$$

is acquired.

The second acquiring unit 43 is configured to acquire a laxity of the currently scheduled thread according to the remaining execution time of the currently scheduled thread and a deadline of the currently scheduled thread.

Assuming that a current moment is t, the deadline of the currently scheduled thread is D, and the laxity of the currently scheduled thread is L, L=D−t−X.

Because the remaining execution time of the currently scheduled thread is dynamically acquired according to the execution progress of the currently scheduled thread and the time for which the currently scheduled thread has been executed, the laxity of the currently scheduled thread is also dynamically acquired.

The second determining unit 44 is configured to determine a priority of the thread according to the laxity of the currently scheduled thread, and re-determine a priority queue according to the determined priority.

The laxity of the currently scheduled thread is a corrected accurate value, an accurate thread priority may be obtained according to the laxity of the currently scheduled thread, and then a priority queue is re-determined according to the priority. If the currently scheduled thread has a high priority, the currently scheduled thread is put into a high-priority queue to queue up; otherwise, the currently scheduled thread is put into a common-priority queue to queue up.

The scheduling unit 45 is configured to successively schedule threads in the queue according to the re-determined priority queue.

Further, that the determining, by the first determining unit 41, that laxity correction should be performed for a currently scheduled thread includes:

determining whether the execution progress of the currently scheduled thread is equal to a preset task proportion; and if the execution progress of the currently scheduled thread is equal to the preset task proportion, determining that laxity correction should be performed for the currently scheduled thread.

The preset task proportion may be a value set in a program, and the execution progress of the currently scheduled thread may be compared with the value.

When the apparatus is implemented in a manner supported by hardware, the preset task proportion is controlled out of the hardware. For example, if the preset task proportion is 25%, a laxity correction operation may be performed when the task proportion is 25%. Certainly, when the apparatus is implemented in a manner supported by hardware, a laxity correction operation may also be performed randomly, which is not specifically limited in this embodiment of the present invention.

Optionally, for how to determine that laxity correction should be performed for a currently scheduled thread, the first determining unit 41 may also determine, by comparing the time for which the currently scheduled thread has been executed with a preset time, to perform laxity correction for a currently scheduled thread. and the determining, by the first determining unit 41, that laxity correction should be performed for a currently scheduled thread includes determining whether the time for which the currently scheduled thread has been executed is equal to a preset time; and if the time for which the currently scheduled thread has been executed is equal to the preset time, determining that laxity correction should be performed for the currently scheduled thread.

The foregoing real-time multi-task scheduling apparatus may be implemented by software running on hardware, which is not specifically limited in this embodiment of the present invention.

For a real-time multi-task scheduling method and a whole process from creation of a thread to an end of execution, reference may be made to the description in Embodiment 2, and the details are not described again in this embodiment of the present invention.

This embodiment of the present invention provides a real-time multi-task scheduling apparatus. The apparatus includes a first determining unit, a second determining unit, a first acquiring unit, a second acquiring unit, and a scheduling unit. After the first determining unit determines that laxity correction should be performed for a currently scheduled thread, the first acquiring unit acquires a remaining execution time of the currently scheduled thread according to an execution progress of the currently scheduled thread and a time for which the currently scheduled thread has been executed; then, the second acquiring unit acquires a laxity of the currently scheduled thread according to the remaining execution time of the currently scheduled thread and a deadline of the currently scheduled thread; next, the second determining unit determines a priority of the thread according to the laxity of the currently scheduled thread, and re-determines a priority queue according to the priority of the thread; and finally, the scheduling unit successively schedules threads in the queue according to the re-determined priority queue.

Based on the description of the foregoing embodiment, because during task scheduling, a remaining execution time of a currently scheduled thread can be dynamically corrected, a laxity value of the currently scheduled thread can be further dynamically corrected, thereby obtaining a more accurate task priority, and improving accuracy of real-time multi-task scheduling.

Embodiment 4

Figure 5:
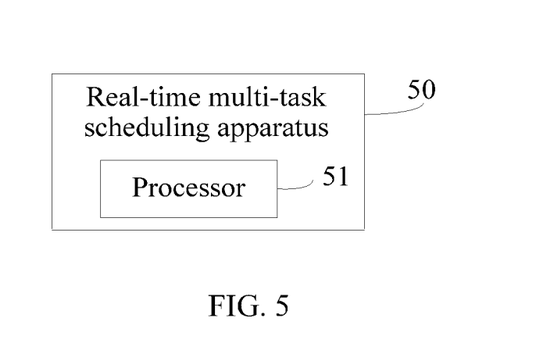
FIG. 5 shows another real-time multi-task scheduling apparatus according to an embodiment of the present invention.

An embodiment of the present invention provides a real-time multi-task scheduling apparatus 50, which is specifically shown in FIG. 5. The apparatus 50 includes a processor 51.

The processor 51 is configured to determine that laxity correction should be performed for a currently scheduled thread.

It may be determined according to a preset task proportion to perform laxity correction for the currently scheduled thread, and it may also be determined according to a preset time to perform laxity correction for the currently scheduled thread. This embodiment of the present invention does not specifically limit how to determine that laxity correction should be performed for the currently scheduled thread.

The processor 51 is further configured to acquire a remaining execution time of the currently scheduled thread according to an execution progress of the currently scheduled thread and a time for which the currently scheduled thread has been executed, where the execution progress is a task completion proportion in the currently scheduled thread.

For a method for acquiring the remaining execution time of the currently scheduled thread, reference may be made to the description in step 102 in Embodiment 1, and the details are not described again in this embodiment of the present invention.

The processor 51 is further configured to acquire a laxity of the currently scheduled thread according to the remaining execution time of the currently scheduled thread and a deadline of the currently scheduled thread.

Assuming that a current moment is t, the deadline of the currently scheduled thread is D, and the laxity of the currently scheduled thread is L, $L=D-t-X$.

Because the remaining execution time of the currently scheduled thread is dynamically acquired according to the execution progress of the currently scheduled thread and the time for which the currently scheduled thread has been executed, the laxity of the currently scheduled thread is also dynamically acquired.

The processor 51 is further configured to determine a priority of the thread according to the laxity of the currently scheduled thread, and re-determine a priority queue according to the priority of the thread.

The laxity of the currently scheduled thread is a corrected accurate value, an accurate thread priority may be obtained according to the laxity of the currently scheduled thread, and then a priority queue is re-determined according to the priority. If the currently scheduled thread has a high priority, the currently scheduled thread is put into a high-priority queue to queue up; otherwise, the currently scheduled thread is put into a common-priority queue to queue up.

The processor 51 is further configured to successively schedule threads in the queue according to the re-determined priority queue.

Further, that the processor 51 determines that laxity correction should be performed for a currently scheduled thread includes determining whether the execution progress of the currently scheduled thread is equal to a preset task proportion; and if the execution progress of the currently scheduled thread is equal to the preset task proportion, determining that laxity correction should be performed for the currently scheduled thread.

When the apparatus is implemented by using software, the preset task proportion is a value set in a program, and the execution progress of the currently scheduled thread may be compared with the value.

When the apparatus is implemented in a manner supported by hardware, the preset task proportion is controlled out of the hardware. For example, if the preset task proportion is 25%, a laxity correction operation may be performed when the task proportion is 25%. Certainly, when the apparatus is implemented in a manner supported by hardware, a laxity correction operation may also be performed randomly, which is not specifically limited in this embodiment of the present invention.

Optionally, for how to determine that laxity correction should be performed for a currently scheduled thread, the processor 51 may also determine, by comparing the time for which the currently scheduled thread has been executed with a preset time, to perform laxity correction for a currently scheduled thread, and the method includes determining whether the time for which the currently scheduled thread has been executed is equal to a preset time; and if the time for which the currently scheduled thread has been executed is equal to the preset time, determining that laxity correction should be performed for the currently scheduled thread.

For a real-time multi-task scheduling method and a whole process from creation of a thread to an end of execution, reference may be made to the description in Embodiment 2, and the details are not described herein again.

This embodiment of the present invention provides a real-time multi-task scheduling apparatus, where the apparatus includes a processor. First, the processor determines that laxity correction should be performed for a currently scheduled thread; next, acquires a remaining execution time of the currently scheduled thread according to an execution progress of the currently scheduled thread and a time for which the currently scheduled thread has been executed; and then, acquires a laxity of the currently scheduled thread according to the remaining execution time of the currently scheduled thread and a deadline of the currently scheduled thread, so as to determine a priority of the thread according to the laxity of the currently scheduled thread, and re-determine a priority queue according to the priority of the thread; and finally, the processor successively schedules threads in the queue according to the re-determined priority queue.

Based on the description of the foregoing embodiment, because during task scheduling, a remaining execution time of a currently scheduled thread can be dynamically corrected, a laxity value of the currently scheduled thread can be further dynamically corrected, thereby obtaining a more accurate task priority, and improving accuracy of real-time multi-task scheduling.

A person of ordinary in the art may understand that all or a part of the steps of the method embodiments may be implemented by a program instructing relevant hardware. The program may be stored in a computer readable storage medium. When the program runs, the steps of the method embodiments are performed. The foregoing storage medium includes any medium that can store program code, such as a read-only memory (ROM), a random access memory (RAM), a magnetic disk, or an optical disc.

The foregoing descriptions are merely specific implementation manners of the present invention, but are not intended to limit the protection scope of the present invention.

What is claimed is:

1. A real-time multi-task scheduling method performed by a processor in a computing system for dynamically scheduling a plurality of tasks in the computing system, wherein the method comprises:
   determining a laxity of a scheduled task, wherein the laxity refers to a remaining idle time of the scheduled task based on a difference between a deadline for execution of the scheduled task and expected execution time of the scheduled task;
   assigning a first priority to the scheduled task based on the determined laxity of the scheduled task;
   determining a first priority queue of a plurality of priority queues for the scheduled task according to the assigned first priority of the scheduled task;
   determining that a laxity correction should be performed for the scheduled task during execution of the scheduled task according to a task completion proportion and a preset time, wherein the laxity correction is performed after the task completion proportion of the scheduled task is at least equal to a preset task proportion, wherein the task completion proportion is a percentage of execution progress of the scheduled task defined by a ratio of execution time at a current moment of time to the expected execution time of the scheduled task, wherein the preset task proportion is preset by setting a value in a program;
   acquiring a remaining execution time of the scheduled task according to the execution progress of the scheduled task and a time for which the scheduled task has been executed after determining that the laxity correction should be performed;
   acquiring a corrected laxity of the scheduled task according to the remaining execution time of the scheduled task and a deadline of the scheduled task after determining that the laxity correction should be performed;
   determining a second priority of the scheduled task according to the corrected laxity of the scheduled task, wherein the second priority is determined after the first priority;
   determining a second priority queue of the plurality of priority queues according to the second priority of the scheduled task, wherein the second priority queue is determined after the first priority queue; and
   scheduling the plurality of tasks according to the plurality of priority queues.

2. The method of claim 1, wherein the scheduled task is either put into the first priority queue or the second priority queue based on the laxity of the scheduled task.

3. The method of claim 1, wherein the first priority and the second priority of the scheduled task is based on the deadline of the scheduled task.

4. The method of claim 1, wherein the preset task proportion is a predefined percentage of the execution progress of the scheduled task.

5. The method of claim 1, further comprising:
   creating a thread comprising the scheduled task; and
   setting the deadline for the scheduled task and an expected completion time of the scheduled task as a required execution time.

6. The method of claim 1, wherein a data pointer of the scheduled task is associated with information about the scheduled task, and wherein the information comprises the deadline of the scheduled task, the remaining execution time required for completing the scheduled task, and an identifier of the scheduled task.

7. A real-time multi-task scheduling apparatus for dynamically scheduling a plurality of tasks in a computing system, comprising:
at least one hardware processor configured to:
determine a laxity of a scheduled task, wherein the laxity refers to a remaining idle time of the scheduled task based on a difference between a deadline for execution of the scheduled task and expected execution time of the scheduled task;
assign a first priority to the scheduled task based on the determined laxity of the scheduled task;
determine a first priority of the scheduled task according to the determined laxity of the scheduled task, wherein a smaller laxity indicates a higher priority, and wherein the laxity of the scheduled task refers to a remaining idle time based on a difference between a deadline for execution of the scheduled task and expected execution time of the scheduled task;
determine a first priority queue of a plurality of priority queues for the scheduled task according to the determined first priority of the scheduled task;
determine that a laxity correction should be performed for the scheduled task during execution of the scheduled task according to a task completion proportion and a preset time, wherein the laxity correction is performed after the task completion proportion of the scheduled task is at least equal to a preset task proportion, wherein the task completion proportion is a percentage of execution progress of the scheduled task defined by a ratio of execution time at a current moment of time to the expected execution time of the scheduled task, wherein the preset task proportion is preset by setting a value in a program;
acquire a remaining execution time of the scheduled task according to the execution progress of the scheduled task and a time for which the scheduled task has been executed after determining that the laxity correction should be performed;
acquire a corrected laxity of the scheduled task according to the remaining execution time of the scheduled task and a deadline of the scheduled task after determining that the laxity correction should be performed;
determine a second priority of the scheduled task according to the corrected laxity of the scheduled task, wherein the second priority is determined after the first priority;
determine a second priority queue of the plurality of priority queues according to the second priority of the scheduled task, wherein the second priority queue is determined after the first priority queue; and
schedule the plurality of tasks according to the plurality of priority queues.

8. The apparatus of claim 7, wherein the scheduled task is either put into the first priority queue or the second priority queue based on the laxity of the scheduled task.

9. The apparatus of claim 7, wherein the first priority and the second priority of the scheduled task is based on the deadline of the scheduled task.

10. The apparatus of claim 7, wherein the preset task proportion is a predefined percentage of the execution progress of the scheduled task.

11. The apparatus of claim 7, wherein the at least one hardware processor is further configured to:
create a thread comprising the scheduled task; and
set the deadline for the scheduled task and an expected completion time of the scheduled task as a required execution time.

12. The apparatus of claim 7, wherein a data pointer of the scheduled task is associated with information about the scheduled task, and wherein the information comprises the deadline of the scheduled task, the remaining execution time required for completing the scheduled task, and an identifier of the scheduled task.

13. The apparatus of claim 7, wherein a smaller laxity indicates a higher priority.

14. A non-transitory computer-readable storage medium including at least instructions stored therein for dynamically scheduling a plurality of tasks associated with a computing device wherein when executed on a processor, the computer-readable storage medium causes the processor to be configured to:
determine a laxity of a scheduled task, wherein the laxity refers to a remaining idle time of the scheduled task based on a difference between a deadline for execution of the scheduled task and expected execution time of the scheduled task;
assign a first priority to the scheduled task based on the determined laxity of the scheduled task, wherein a smaller laxity indicates a higher priority;
determine a first priority queue of a plurality of priority queues for the scheduled task according to the assigned first priority of the scheduled task;
determine that a laxity correction should be performed for the scheduled task during execution of the scheduled task according to a task completion proportion and a preset time, wherein the laxity correction is performed after the task completion proportion of the scheduled task is at least equal to a preset task proportion, wherein the task completion proportion is a percentage of execution progress of the scheduled task defined by a ratio of execution time at a current moment of time to the expected execution time of the scheduled task, wherein the preset task proportion is preset by setting a value in a program;
acquire a remaining execution time of the scheduled task according to the execution progress of the scheduled task and a time for which the scheduled task has been executed after determining that the laxity correction should be performed;
acquire a corrected laxity of the scheduled task according to the remaining execution time of the scheduled task and a deadline of the scheduled task after determining that the laxity correction should be performed;
determine a second priority of the scheduled task according to the corrected laxity of the scheduled task, wherein the second priority is determined after the first priority;
determine a second priority queue of the plurality of priority queues according to the second priority of the scheduled task, wherein the second priority queue is determined after the first priority queue; and
schedule the plurality of tasks according to the second priority queue.

15. The non-transitory computer-readable storage medium of claim 14, wherein the scheduled task is either put into the first priority queue or the second priority queue based on the laxity of the scheduled task.

16. The non-transitory computer-readable storage medium of claim 14, wherein the first priority or the second priority of the scheduled task is based on the deadline of the scheduled task.

17. The non-transitory computer-readable storage medium of claim 14, wherein the preset task proportion is a predefined percentage of the execution progress of the scheduled task.

18. The non-transitory computer-readable storage medium of claim 14, wherein the instructions further cause the processor to be configured to:
   create a thread comprising the scheduled task; and
   set the deadline for the scheduled task and an expected completion time of the scheduled task as a required execution time.

19. The non-transitory computer-readable storage medium of claim 14, wherein a data pointer of the scheduled task is associated with information about the scheduled task, and wherein the information comprises the deadline of the scheduled task, the remaining execution time required for completing the scheduled task, and an identifier of the scheduled task.

20. The non-transitory computer-readable storage medium of claim 14, wherein the instructions further cause the processor to be configured to acquire, the corrected laxity of the scheduled task according to an equation $L=D-t-X$, wherein L is the laxity of the scheduled task, D is the deadline of the scheduled task, t is the current moment of time, and X is the remaining execution time of the scheduled task.

* * * * *

UNITED STATES PATENT AND TRADEMARK OFFICE
CERTIFICATE OF CORRECTION

PATENT NO. : 9,990,229 B2  
APPLICATION NO. : 14/730425  
DATED : June 5, 2018  
INVENTOR(S) : Dongrui Fan et al.

Page 1 of 1

It is certified that error appears in the above-identified patent and that said Letters Patent is hereby corrected as shown below:

On the Title Page

Under Notice should read:
Subject to any disclaimer, the term of this patent is extended or adjusted under 35 U.S.C. 154(b) by 0 days.

Page 2 under item (56), U.S. Patent Documents should read:
6,411,982 B1 6/2002 Williams................ 718/102

Signed and Sealed this
Seventeenth Day of July, 2018

Andrei Iancu
*Director of the United States Patent and Trademark Office*